United States Patent [19]

Scotti et al.

[11] 4,350,774

[45] Sep. 21, 1982

[54] POLYMERIC FOAM CAULKING COMPOSITIONS

[76] Inventors: Frank Scotti, 450 Indian Rd., Wayne, N.J. 07470; Edward H. Page, 1021 Hillcrest Ave., Ridgewood, N.J. 07450

[21] Appl. No.: 299,507

[22] Filed: Sep. 4, 1981

Related U.S. Application Data

[63] Continuation of Ser. No. 103,428, Dec. 14, 1979, abandoned.

[51] Int. Cl.[3] .............................. C08J 9/12; C08J 9/14
[52] U.S. Cl. ..................................... 521/95; 222/394; 521/78; 521/98; 521/149; 521/910
[58] Field of Search ................... 521/78, 95, 910, 98, 521/149; 222/394

[56] References Cited

U.S. PATENT DOCUMENTS

| | | | |
|---|---|---|---|
| 3,343,718 | 9/1967 | Siegel et al. | 521/78 |
| 3,572,330 | 3/1971 | Gonder | 521/78 |
| 3,705,669 | 12/1972 | Cox et al. | 521/78 |
| 3,912,665 | 10/1975 | Spitzer et al. | 521/98 |
| 3,912,666 | 10/1975 | Spitzer et al. | 521/78 |
| 3,912,667 | 10/1975 | Spitzer et al. | 521/65 |

*Primary Examiner*—Morton Foelak

[57] ABSTRACT

A composition suitable for preparing a stable cellular foam, aerosol containers containing the composition, and methods of using the foamed composition to caulk and insulate, where the composition includes an emulsion of one or more foamable polymers and dispersed in the emulsion a foam forming amount of a mixture of a volatile organic liquid compound selected from the group consisting of a volatile hydrocarbon, a volatile halogenated hydrocarbon and mixtures thereof, and nitrous oxide, wherein the weight ratio of the organic liquid compound to nitrous oxide is selected such that the foam is self leveling and the volume of the foam is not greater than six times the volume of the composition.

32 Claims, No Drawings

POLYMERIC FOAM CAULKING COMPOSITIONS

This is a continuation, of application Ser. No. 103,428 filed Dec. 14, 1979 now abandoned.

BACKGROUND OF THE INVENTION

1. Field of the Invention

This invention relates to foamed polymeric compositions which are especially useful as insulating, caulking and sealing compositions.

2. Description of the Prior Art

Insulating, caulking and sealing compositions are known. These conventional compositions include a wide range of compounds which are used in the construction, manufacturing and transportation industries. These compositions are used to seal joints or voids against water and water vapor, air and other gases, dust, sound, vermin, heat and cold, and to insulate piping and heating systems to prevent heat loss. Specialized applications require resistance to certain chemicals or atmosphere. Some compounds are applied after the structure is complete, as in masonary joints; others are applied at the time of manufacture, or in automobile and trailer bodies.

One type of caulking composition which has attained widespread popularity is the type based on polymers and mixtures of polymers. For example, U.S. Pat. No. 3,551,379 to Reinhard, et al. describes polymeric caulking compositions based on mixtures of polymers of esters, of ethylenically unsaturated carboxylic acids having three to five carbon atoms, and alkanols having one to twelve carbon atoms. In general, these caulking and sealing compositions are prepared by melting together the components or by mixing solutions of the polymers, or by mixing suitable monomers with bitumen, tar or pitch and effecting polymerization when these mixtures are used.

These conventional caulking compositions are available in a variety of forms and packages, which are dependent on the form in which the composition is to be applied and its physical properties. For example, they are supplied generally in the form of knife- or gun-grade compositions. The knife-grade materials are the stiffer of the two, and lend themselves to putty-knife application. The gun-grade compositions are extruded through an orifice, using a hand or pressure-operated caulking gun.

The use of aqueous polymer dispersions for gunnable or extruded caulking compositions has gained wide acceptance because of their ease of cleaning. The aqueous polymer dispersions are readily removed from tools, hands, etc., because of their dispersibility in water. They have the further advantage of being non-flammable and having low odor characteristics. The acrylic aqueous polymer dispersions also have excellent outdoor stability and can be painted over after approximately two hours of drying. However, these compositions as well as solvent basic formulations suffer from a number of inherent disadvantages. Normally, these compositions must be dispensed from a cartridge through the use of a caulking gun because of their high viscosity.

The cartridges in which these compositions are packaged are usually the type having an enclosed plastic nozzle through which the composition is dispensed. When used a portion of the plastic nozzle is cut off, forming a dispensing orifice which will dispense caulking composition in a certain cylindrical size which is usually called by those skilled in the art "the bead size". This is disadvantageous for the following reasons. First, the bead once dispensed must be forced into the crack which is to be sealed to afford a flush, even, unabrasive finish. The act of finishing the bead is called "tooling." The tooling is done with a variety of tools, depending on the surface characteristics of the area to be caulked. The tools will vary from putty knives, spatulas, cornering knives or even the use of fingers as a finishing tool. Some mechanics will bevel the cut on the tube orifice and use the tube as the tooling device as the caulk is dispensed. This is done by applying pressure on the existing caulk with one hand while simultaneously moving the gun in the direction of the exiting caulk and using the trigger on the gun with the other hand. This method works very effectively where the surface is perfectly smooth and provided that the mechanic is skilled in coordinating these simultaneous manipulations. However, where the surface is not smooth which is the majority of the cases such as situations where cedar shakes and other irregular sidings are being caulked, the tooling of the dispensed caulk is necessary.

A second disadvantage is associated with varying the bead size. When a portion of the plastic nozzle is cut off, it is impossible to further restrict the exiting bead for smaller cracks. Thus, excess quantities of caulk are dispensed, and must be disposed of during the tooling procedures. It is apparent this leads to a waste of caulking material.

A third disadvantage associated with known gunnable and extrudable caulking compositions is that known methods of dispensing these compositions such as the use of a caulking gun or putty knife requires the use of two hands. Thus, the use of these methods is restricting and dangerous when the methods are employed in situations where at least one hand is required for safety reasons. For example, the physical limitation of using two hands can be extremely dangerous in caulking a house where it is often necessary to work on a ladder at some distance from the ground and at least one hand is required for balancing.

Another disadvantage associated with the use of conventional gunnable or extrudable caulking compositions, is that at temperatures below 40° F., they become to viscous to be gunned or otherwise extruded. This necessitates the added inconvenience of heating conventional caulking compositions when operating at temperatures lower than 40° F.

Accordingly, there is a need for a polymeric caulking composition that cures the aforementioned disadvantages of the conventional knife and gun-grade compositions. More specifically, there is a need for a caulk that is self-leveling; (does not need tooling) can be dispensed with convenient adjustment of the bead width; can be dispensed using one hand thus making the caulking process safer; and finally, a caulk which can be dispensed at temperatures lower than 40° F. Those of skill in the art have suggested the use of foam polymeric compositions for caulking and insulating.

One drawback of these compositions has been the difficulties associated with preparation of the foamed caulking material. Heretofore, foamed materials have been generally prepared by processes which are not suitable for use in the home or for application in the field. Recently, foamable compositions have been prepared by mixing a polymer, and a polymersoluble inert blowing and propelling agent under pressure in an aerosol container. The blowing agent is usually a generally volatile organic liquid which vaporizes when released from the container, and thereby foams the polymeric material. For example, U.S. Pat. No. 3,640,916 describes foamed caulking and insulating compositions based on a cross-linked acrylic emulsion polymer and in which various hydrocarbons and halogenated hydrocarbons are the blowing and propelling agent. These compositions have not been acceptable as caulking compositions because they are not self-leveling. As a consequence use of aforementioned invention leads to caulks which require tooling. If not tooled the physical properties of the caulk are unacceptable in that they form a very low density foam with poor physical characteristics. These caulks expand to at least six times their original volume forming a low density cylindrical bead or a collapsed cylindrical bead which on drying leads to an unsightly wrinkled effect.

Accordingly, it is an object of this invention to provide a foamable caulking composition, which obviates the defects of known caulking compositions.

It is another object of this invention to provide a foamable caulking composition which is resistant to environmental factors, and which adheres well and exhibits the so called self-leveling characteristic.

It is still another object of this invention to provide a caulking composition that can be conveniently used at temperatures of less than 45° F.

It is also an object of this invention to provide an aerosol dispensed caulking composition which can be used in the home or in other like field environments and which can be dispensed in a tight ribbon.

It is yet another object of this invention to provide a foamable caulking composition which can be dispensed from an aerosol container in ribbons of varying sizes.

It is still another object of this invention to provide an aqueous polymeric based caulking composition which can be dispensed in small cracks or crevices.

It is yet another object of this invention to provide a foamable aerosol dispensed aqueous polymer based foam composition which forms a foam caulking composition which is self leveling, and which does not drip from overhead or vertical surfaces.

It is still another object of this invention to provide an aerosol container including the caulking composition of this invention, said container being adapted to dispense the composition in ribbons of varying size.

Other objects and advantages will be apparent to one of skill in the art from the following description and appended claims.

SUMMARY OF THE INVENTION

The aforementioned objects are achieved by the present invention which provides a composition which is suitable for preparing a stable cellular foam which is extremely useful as a caulking and sealing composition. In its broadest aspect, the composition of this invention comprises:

An emulsion of a foamable polymer; and dispersed in the emulsion, a foam forming amount of a mixture of a volatile organic liquid compound selected from the group consisting of a volatile hydrocarbon, a volatile halogenated hydrocarbon, and mixtures thereof, and nitrous oxide, wherein the weight ratio of the organic liquid compound to the nitrous oxide is selected such that the foam is self leveling, and the volume of the foam is not greater than six times the volume of the composition. The cellular foam which can be prepared from the composition of this invention is self leveling. Further, the volume of the foam is not greater than six times the volume of the composition of the present invention. Accordingly, these compositions are extremely useful for caulking and sealing because of their stability, and because of the low expansion which enables the depositing of a narrow ribbon of the cellular foam.

In another aspect, this invention relates to a method of caulking and insulating. This method comprises applying to the site to be caulked or insulated, an effective amount of the composition of this invention. As used herein, "an effective amount" refers to the amount required to caulk and insulate to the degree required by the user.

Still another aspect of this invention relates to an aerosol container incorporating the composition of this invention. The container will be pressurized and will also include various dispensing means which are suitable for the production of a foam. The composition enclosed in the container will comprise:

an emulsion of one or more foamable polymers, and dispersed in the emulsion a mixture of a volatile organic liquid compound selected from the group consisting of a volatile hydrocarbon a volatile halogenated hydrocarbon and mixtures thereof, and nitrous oxide. The mixture will be present in an amount sufficient to foam the composition to the extent desired, and to propel the composition from the pressurized container. Further the weight ratio of the volatile organic liquid compound to the nitrous oxide component is selected such that the foam is self leveling, and the volume of the foam is not greater than six times the volume of the composition.

As used herein, "self leveling" refers to that characteristic of the composition of this invention which dispenses with the requirement that the composition must be tooled after being applied to a surface, using conventional caulk tooling procedures. Thus, because of the self leveling characteristic, the composition of this invention will not maintained itself as a substantially cylindrical bead after being applied to the surface being caulked. Rather, the composition will partially collapse into the crack being caulked thereby caulking it, and after drying will provide a substantially tack-free elastic surface, which is substantially even with the surface being caulked. Because of the self leveling characteristic, the composition of this invention is an effective caulking composition, which provides a caulked surface which is aesthetically pleasing to the eye, and which is essentially indistinguishable from the surrounding surface after painting.

DESCRIPTION OF THE PREFERRED EMBODIMENTS

As an essential component, the composition of this invention includes an emulsion of a "foamable polymer", having a high molecular weight in the order of from about 20,000 to about 100,000 molecular weight units, and having a mean glass transition temperature of less than 15° C. "Foamable polymer" as used herein refers to any polymer or combination of polymers which can be foamed to form the desired cellular structure when subjected to the action of a gaseous blowing agent. "Mean glass transition temperature" as used herein refers to the average glass transition temperature of the polymer or mixtures of polymers. Such useful polymer compounds are well known to those of skill in the foam forming art. For example, homopolymers and copolymers of aliphatic and aromatic ethylenically unsaturated compounds can be used as the polymer component of the composition of this invention. Illustrative of these compounds are acrylic polymers such as those prepared by the addition polymerization of acrylonitrile, methacrylonitrile, and the like, and the polymers of ethylenically unsaturated carboxylic acid compounds and their corresponding alkyl esters such as the addition polymers of acrylic acid, methacrylic acid, methyl acrylic acid, ethyl acrylic acid, maleic acid, fumaric acid, itacoic acid and the like. Also useful as the polymer component of the foamable polymer component of the composition of this invention are the homopolymer and copolymers of alphatic and aromatic $\alpha,\beta$-unsaturated compounds such as polyethylene, polypropylene, polystyrene, polyvinylchloride, polyvinyl acetate, polyisobutylene, poly (methyl-sytrene), polyvinyl ether, polyvinyl fluoride, polyvinyl pyrrolidine, polyvinyl alcohol, vinylidene chloride and the like. Also useful are homopolymers, and copolymers having recurring amide and ester linkages. Illustrative of such compounds are nylon-6, N-methyl nylon-6, polyethylene orthophthalate, polyethylene tetraphthalate and the like. Illustrative of other classes of useful polymers are polyalkylene oxides such as polyethylene oxide, polypropylene oxide, and other types of epoxy type resins. The homopolymers and copolymers of 1,4-diene compounds, such as butadine, 2-chlorobutadiene, isoprene and the like are also useful. Polyurethanes, polysulfides and various urea/formaldehyde based polymers can also be used in the practice of this invention.

The polymeric component of the composition of this invention is preferably in the form of an emulsion. The type of liquid used to form the emulsion is not critical, however, for convenience water is preferably employed.

The quantity of the polymer emulsion employed in the composition of this invention is not critical, and can be varied over a widerange depending on the needs of the individual user. However, in the preferred embodiments of this invention, the composition will include from about 40 to about 50 weight present of the emulsion, based on the total weight of the composition. The emulsion in turn will preferably include a polymer solids content of from about 60 to about 65 weight percent based on the total weight of the emulsion.

The polymers employed as ingredients in the composition of this invention can be conveniently prepared employing known techniques such as conventional polymerization techniques using base or acid catalysts, or free radical initiators. Such techniques are well known to those of skill in the chemical arts and will not be discussed here in detail. However, because the polymer is preferably used in the form of an aqueous emulsion, the polymer is preferably prepared in accordance with the conventional emulsion polymerization techniques.

While not a critical component, the polymeric emulsion may optionally include surfactant or emulsifying agents. The polymers containing acid moieties, as, for example, polyacrylic and polymethacrylic acids, will generally have some degree of self emulsifying capability and accordingly additional surfactants or emulsifying agents may not be needed. However, in those cases where the polymer is not self emulsifying, the use of surfactants or dispersing agents is desirable to improve the stability of the emulsion. Useful surfactants and dispensing agents include cationic, anionic or non-ionic surfactants.

Anionic surfactants include organic compounds having carboxylate moieties such as sodium oleate, potassium stearate, sodium laurate and the like, and long chain alkyl sulfonates and sulfates, such as myristyl sulfate. Illustrative of suitable cationic surfactants are those derived from the amino group, through either primary, secondary, or tertiary amine salts, where the hydrophilic character is achieved by aliphatic and aromatic groups that can be altered by substituents of varying polarity. Other nitrogen compounds such as quaternary ammonium compounds, quanidine and thiuronium salts, are useful as cationic surfactants.

Useful non-ionic surfactants are organic compounds which contain groups of varying polarity, and which render parts of the molecule lyophilic, whereas other parts of the molecule are lyophobic. Examples of such non-ionic surfactants are polyethylene glycol, polyvinyl alcohol, polyethers, polyesters, polyhalides and the like.

The preferred surfactants and emulsifying agents are noionic surfactants, in particular the ethylene oxide adducts of hydrophobic compounds such as nonyl and octyl phenol.

Varying amounts of cross-linking can be introduced in the polymer in accordance with the type and amount of cross-linking agents used. Such cross-linking contributes to both the ultimate strength of the foam and to the speed with which the foam "sets-up" or reaches a state of sufficient strength to withstand physical deformation. It also gives reduced "tack-free times" and increases the rigidity of the foam. Useful cross-linking agents include the complexes of polyvalent metal ions such as zirconium, zinc, cadmium, copper or nickel, with volatile complexing agents such as ammonia or a volatile amine such as trimethyl amine and triethyl amine, together with anions such as carbonate or acetate. The nature and use of these illustrative complex cross-linking agents are particularly described in U.S. Pat. No. 3,308,078 to Rogers et al., and U.S. Pat. No. 3,320,169 to Rogers, the disclosure of which are incorporated herein by reference.

Other cross-linking agents will include a multiplicity of polymerizable moieties as for example a double bond, a carbonyl group, a carboxyl group, and the like, each of which can take part in the formation of a growing polymer chain, thereby interconnecting the principal backbone of the polymer with cross-linking molecules. The multiplicity of polymerizable groups within each molecule of the cross-linking agent, and the level of use of the cross-linking agent, determine the degree of cross-linking in the polymer. Examples of such cross-linking agents which are especially useful with acrylic emulsion polymers are ethylene diacrylate, a difunctional cross-linking agent; trimethylol propane triacrylate, a trifunctional cross-linking agent; and pentaerythritol tetraacrylate, a tetra functional cross-linking agent. Still, other cross-linking agents, such as calcium or magnesium sulfate, acetate or chloride, or polyamines such as diethylene triamine, can also be used.

In addition to the polymer component, the composition of this invention will contain a mixture of a volatile liquid organic compound, having a vapor pressure of at least about 2 p.s.i.a. at about 20° C., and nitrous oxide. The weight ratio of the liquid organic compound to the nitrous oxide is selected such that the foam is self leveling, and the volume of the foam is not greater than six times the volume of the composition of this invention.

The volatile organic liquid compound should be insoluble in water and inert, i.e., that is will not react, complex or otherwise interfere, with the other components of the composition. The particular organic liquid employed will depend upon the particular desired end use. In applications where it is desirable that a foam be generated after the composition is applied to a surface, volatile liquids having a relatively low vapor pressure, say 2 to 15 p.s.i.a., are preferably incorporated. Illustrative of such compounds are hydrocarbons having from about three to about eight carbon atoms, and halogenated hydrocarbons having up to five carbon atoms. Examples of such suitable volatile organic liquid compounds are hydrocarbons such as propane, n-butane, isobutane, hexane, n-pentane, 2-methylbutane, n-heptane, 1-pentene, 2-methyl-2-butane cyclobutane, cyclopentane, cyclohexane, and mixtures thereof and halogenated hydrocarbons such as trichlorofluoromethane, carbon tetrachloride, trichloromethane, dichloromethane, 1,1,1-trichloroethane, 1,1 or 1,2-dichloroethane (1,1 or 1,2) ethyl bromide, 1 or 2-chloropropene, 1 or 2-bromopropane, 1 or 2 chloropropane, trichlorotrifluoroethane, dichlorodifluoroethane, octofluorocyclobutane, dichlorotetrafluorothane, chlorotrifluoroethane, and mixtures thereof. Preferred organic liquid compounds for use in the composition of this inventions are hydrocarbons such as n-hexane, isobutane, n-butane, n-pentane and the like.

The weight ratio of the weight percent of the liquid organic compound to the weight percent of nitrous oxide is critical and should be such that the foam is self leveling on standing and the volume of the foam is not greater than six times the volume of the composition from which the foam is prepared. Generally these objectives are achieved when the weight ratio of the liquid organic compound to nitrous oxide is within the range of from about 1 to 15 to about 15 to 1. In the preferred embodiments of the invention, which produces especially good results, the weight ratio of organic compound to nitrous oxide will vary in the range of from about 1 to 6 to about 6 to 1.

The composition of this invention will include a foam forming amount of the mixture of the volatile organic liquid hydrocarbon and nitrous oxide. That is an amount sufficient to produce the desired cellular structure. In the embodiment of this invention where the composition is packaged in an aerosol type container, the amount of the mixture should also be sufficient to expel the composition from the aerosol container. These characteristics are achieved when the mixture is used in an amount of from about 1 to about 15% by weight, and preferably from about 1 to about 6% by weight based on the total weight of the composition. The precise amount of the mixture used will often depend upon the viscosity of the composition, the vapor pressure of the liquid, the type of foam desired and other factors which are well known to those of skill in the relevant art. Generally, larger amounts of the mixture are employed when foams of low density are desired. Smaller amounts of the mixture are used to produce firmer, denser foams. The combination of large amounts of the mixture together with low polymer solids contents in the polymer emulsion, produces foams having open pores and a random pattern of voids. High polymer solids content coupled with low levels of the mixture result in foams having a uniform cell structure of predominantly closed cells.

In addition to the polymer emulsion component and the mixture of a volatile organic liquid compound, and the nitrous oxide, the composition of this invention may include optional ingredients for various purposes. Such optional ingredients include those conventional additives which are used by those of skill in the art of polymer compositions, such as foaming agents, cell modifiers, foam structuring agents, such as fatty acids, and fatty alcohols, and the like additives that can be included for the purpose of modifying the structure of the foam. Other conventional additives include dyes or pigments, conventional stabilizers, fragrances, plasticizers and drying aids for the polymer can also be used. Thickeners such as carboxymethyl cellulose can be employed to control the viscosity of the composition and the resulting foam structure. Fillers such as carbon black, silica, asbestos, powder chalk, heavy spar, blanc-fixe, titanium dioxide, quartz powder, zinc oxide, talc, kaolin, calcium carbonate and the like are examples of inorganic fillers which can be employed in the composition of this invention. However, when using such fillers it is desirable to employ a dispersant such as potassium hexametaphosphate, to disperse the filler and to prevent sedimentation of the filler in the composition. The composition of this invention may also include compatible polyhydric alcohols such as ethylene glycol and propylene glycol to improve the freeze thaw stability and application characteristics of the composition. Various additives other than those set forth above are known to those of skill in the art, and these additives can be used to vary the properties of the foams prepared from the compositions of this invention.

The compositions of their invention are compatible with various convenient packaging techniques. Preferably, the compositions of this invention are packaged in pressurized containers in which case part of the mixture of the volatile organic liquid compound and nitrous oxide which was previously described can be used as the propellant to expel the composition from the container. The compositions of the present invention can be packaged in any conventional container for pressurized materials, including metal cans, glass bottles, reinforced plastic containers and like containers of any desired size. These containers will usually be fitted with valve and dispensing assemblies suitable for the production of foam, as for example, narrow or wide discharge foam heads or actuators designed to produce the foam on impingement. The containers may also be fitted with dip tubes, with a flexible dispensing tube attached to the outlet of the discharge orifice of the foam head, or provided with other assemblies which enable the use of the container in an inverted position.

The compositions of this invention are suitable for a variety of uses. The foams produced from the compositions generally reach a tack free state within a reasonably short time, for example, from about 1 to about 3 hours after application, and are, therefore, especially convenient for home application. The foams can be used to form insulating coatings on pipes, heaters and the like, or to prepare cushioning coatings for items that require protection during shipping. These foams are also useful as sealing coatings for porous masonary, as paper coatings, and as adhesives.

The foam prepared from the composition of this invention is especially useful as a caulking and insulating composition because of its unique properties. Because the foam is self leveling no tooling is required and even coatings can be applied. Further, the low expansion ratios between the foam and the composition enables the user to deposit a narrow ribbon of the foam to a crevice, gap or the like being caulked or sealed. Further, because the foam is dispended under force of the gaseous propellant, the size of the ribbon can be further decreased or increased merely by lessening or increasing the rate of flow from the discharge orifice. Lastly, because the foam is soft and flowable when it is deposited under the impetus of the propellant mixture, the foam can be forced into narrow cracks and crevices and thereby assure a tight and complete seal.

As has been explained previously, the stiffness, porosity, cell structure, tack-free time and application of the foam prepared from the compositions of this invention can be tailored to the needs of each of the aforementioned uses by a proper selection of the polymer composition, type of volatile organic compound, amount of nitrous oxide, amount ov volatile organic liquid, surfactant and other additives.

The compositions of this invention can be prepared and packaged according to conventional methods known to those of skill in the art. The composition of this invention can be conveniently prepared merely by mixing the various ingredients by any order of addition. For example, a composition of this invention can be conveniently prepared and packaged in a pressurized aerosol container as follows.

An aqueous emulsion is prepared by adding the desired monomer in the desired amount of water, in the presence of a free radical initiator, thereby forming the polymeric emulsion. Next, emulsifying agents or other desired optional ingredients are added in any order of addition to form a pre-concentrate. The desired amount of the pre-concentrate is then added to an aerosol container fitted with dispensing means suitable for the production of foam. The air inside of the container is evacuated by vacuum pump, and the desired quantity of the organic liquid compound and nitrous oxide is added individually.

The following specific examples are presented to more fully illustrate the preferred embodiments of this invention. In the examples, all weight percents are based on the total weight of the composition.

EXAMPLE I

A mixture was formed by mixing 1,000 grams of a 65% aqueous emulsion of a polymer of butyl acrylate monomer, having a glass transition temperature of about −50° C., 1000 grams of finely divided calcium carbonate and 15 grams of potassium hexametaphosphate. To this mixture was added 17.65 grams of a mixture of 2 grams of an octylphenolethylene oxide adduct, 6 grams of ethylene glycol and 4 grams of carboxymethyl cellulose. The ingredients were mixed well to form a concentrate. Aliquots of the resulting concentrate were used in the following Examples II to XX.

EXAMPLE II

To an aerosol container fitted with a standard foam head was added 300 grams of the concentrate of Example I. The air was then evacuated from the container. The container was then pressurized, sequentially, with 1.5 grams of isobutane and 4.5 grams of nitrous oxide which, respectively, represented 0.5 and 1.50 weight percent of the composition in the container.

The foam head was activated, and the composition was expelled from the container by force of the mixture of nitrous oxide and isobutane to form a white foam, which did not slump and was self leveling. The foam was also expelled in a narrow ribbon which indicated that the ratio of expansion between the composition and the foam was very low. After drying, the foam was persistent, water resistant and under went little further shrinkage. This foam and similar foams can be employed as either caulking or insulating materials.

EXAMPLE III

To an aerosol container fitted with a standard foam head was added 300 grams of the concentrate of Example I. The air was then evacuated from the container. The container was then pressurized with 1.5 grams of n-butane and 4.5 grams of nitrous oxide which, respectively, represented 1.00 and 1.50 weight percent of the composition in the container. The composition was expelled from the container by force of the mixture nitrous oxide and the n-butane to form a white foam which had a smooth surface, and which dried to the touch quickly. The foam was also expelled in a narrow ribbon which indicated that the ratio of expansion between the composition and the foam was very low. After drying, the foam was persistent, water resistant and under went little shrinkage. This foam and similar foams can be employed as caulking or insulating materials.

EXAMPLE IV

To an aerosol container fitted with a standard foam head was added 300 grams of the concentrate of Example I. The air was then evacuated from the container. The container was then pressurized with 1.5 grams of n-pentane and 4.5 grams of nitrous oxide which, respectively, represented 1.00 and 1.50 weight percent of the composition in the container.

The composition was expelled from the container by force of mixture of the nitrous oxide and n-pentane to form a white foam, which had a smooth surface, and which dried to the touch quickly. The foam was also expelled in a narrow ribbon which indicated that the ratio of expansion between the composition in the container and the foam was very low. After drying, the foam was persirent, water resistant and underwent little shrinkage. This foam and similar foams can be employed as caulking or insulating materials.

EXAMPLE V

To an aerosol container fitted with a standard foam head was added 300 grams of the concentrate of Example I. The air was then evacuated from the container. The container was then pressurized with 1.5 grams of n-hexane and 4.5 grams of nitrous oxide which, repectively, represented 0.5 and 1.50 weight percent of the composition in the container.

The composition was expelled from the container by force of the nitrous oxide and n-hexane to form a white foam, which had a smooth surface, and which dried to the touch quickly. The foam was also expelled in a narrow ribbon which indicated that the ratio of expansion between the composition and the foam was very low. After drying, the foam was persirent, water resistant and under went little shrinkage. This foam and similar foams can be employed as caulking or insulating materials.

EXAMPLE VI

To an aerosol container fitted with a standard foam head was added 300 grams of the concentrate of Example I. The air was then evacuated from the container. The container was then pressurized with propane. Propane and the nitrous oxide, respectfully, represented 1.00 and 1.50 weight percent of the composition in the container.

The composition was expelled from the container by force of the mixture of nitrous oxide and propane to form a white foam, which had a smooth surface, and which dried to the touch quickly. The foam was also expelled in a narrow ribbon which indicated that the ratio of expansion between the composition and the foam was very low. However, after drying, the foam was persistent, water resistant and under went little shrinkage. Similar foams can be employed as caulking or insulating materials.

EXAMPLE VII

To an aerosol container fitted with a standard foam head was added 300 grams of the concentrate of Example I. The air was then evacuated from the container. The container was then pressurized with ethane. Ethane represented 1.00 weight percent and the nitrous oxide represented 1.50 weight percent of the composition in the container.

The composition was expelled from the container by force of the mixture nitrous oxide and ethane to form a white foam, which had a smooth surface, and which dried to the touch quickly. The foam was also expelled in a narrow ribbon which indicated that the ratio of expansion between the composition and the foam was very low. After drying, the foam was persistent; water resistant and under went little shrinkage. This foam and similar foams can be employed as caulking or insulating materials.

Examples VIII to XI illustrate the criticality of the volatile organic liquid compound component. In these examples, compositions containing only the nitrous oxide component were evaluated for their usefulness as caulking compositions.

EXAMPLE VIII

To an aerosol container fitted with a standard foam head was added 300 grams of the concentrate of Example I. The air was then evacuated from the container. The container was then pressurized with 2.6 grams of nitrous oxide which represented 0.87 weight percent of the composition. The composition was expelled from the container by the force of the nitrous oxide in the form of a white foam. The foam was unacceptable as a caulking composition because it had p or vertical cling and was not aesthetically pleasing to the eye because of the pocksurface caused by uneven self-leveling.

EXAMPLE IX

To an aerosol container fitted with a standard foam head was added 300 grams of the concentrate of Example I. The air was then evacuated from the container. The container was then pressurized with 5.3 grams of nitrous oxide which represented 1.75 weight percent of the composition.

The composition was expelled from the container by the force of the nitrous oxide in the form of a white foam. As in the case of Example VIII, this composition which included only the nitrous oxide component of the mixture was also unacceptable because of uneven self leveling and the composition had poor vertical cling.

EXAMPLE X

To an aerosol container fitted with a standard foam head was added 300 grams of the concentrate of Example I. The air was then evacuated from the container. The container was then pressurized with 5.9 grams of nitrous oxide which represented 1.93 weight percent of the composition.

The composition was expelled from the container by the force of the nitrous oxide in the form of a white foam. Surface pocking and vertical cling also rendered this foam unacceptable as a caulking and insulating composition because of the large volume of the foam.

EXAMPLES XI

To an aerosol container fitted with a standard foam head was added 300 grams of the concentrate of Example I. The air was then evacuated from the container. The container was then pressurized with 3 grams of n-butane which represented 1.0 weight percent of the composition.

The composition was expelled from the container by force of the n-butane gas forming a white foam. This foam was unacceptable as a caulking and insulating composition because of the large volume of the foam.

EXAMPLE XII

To an aerosol container fitted with a standard foam head was added 300 grams of the concentrate of Example I. The air was then evacuated from the container. The container was then pressurized with 15. grams of n-butane which represented 0.5 weight percent of the composition.

The composition was expelled from the container by force of the n-butane gas forming a white foam. This foam which did not include the nitrous oxide component was also unacceptable as a caulking and insulating composition because of the large volume of the foam.

EXAMPLE XIII

To an aerosol container fitted with a standard foam head was added 300 grams of the concentrate of Example I. The air was then evacuated from the container. The container was then pressurized with 1.5 grams of isobutane which represented 0.5 weight percent of the composition.

The composition was expelled from the container by force of the isobutane gas forming a white foam. This foam which did not include the nitrous oxide component was also unacceptable as a caulking and insulating composition because of the large volume of the foam.

Examples XV and XVIII illustrate the resulting of using carbon dioxide, an incompressible gas, rather than the mixture of nitrous oxide and a volatile liquid organic compound. The compositions of these examples include all the essential components of the composition of this invention, with the exception of the mixture of nitrous oxide and volatile organic liquid compound. Thus, these examples illustrate the criticality of the mixture of nitrous oxide and the volatile organic compound to the beneficial properties of the composition of this invention.

EXAMPLE XIV

To an aerosol container fitted with a standard foam head was added 300 grams of the concentrate of Example I. The air was then evacuated from the container. The container was then pressurized with 4.6 grams of carbon dioxide which represented 1.5 weight percent of the composition. An effort was made to expel the composition from the container by force of the carbon dioxide. This effort failed because the viscosity of the composition was so great that the composition could not be forced out of the container.

EXAMPLE XV

To an aerosol container fitted with a standard foam head was added 300 grams of the concentrate of Example I. The air was then evacuated from the container. The container was then pressurized with 7.7 grams of carbon dioxide which represented 2.5 weight percent of the composition. An effort was made to expel the composition from the container. As in the case of the composition of Example XV, the composition could not be expelled because of its high viscosity.

EXAMPLE XVI

To an aerosol container fitted with a standard foam head was added 300 grams of the concentrate of Example I. The air was then evacuated from the container. The container was then pressurized with 4.6 grams of carbon dioxide which represented 1.5 weight percent of the composition and 3.1 grams of n-butane which represented 1.00 weight percent of the composition.

An effort was made to expel the composition from the container. However, the effort failed because of the high viscosity of the composition. This result indicates that compositions of the type described in the present specification which employ mixtures of carbon dioxide and n-butane, a representative volatile liquid organic compound, as the blowing and propelling agents can not be used in aerosol containers.

EXAMPLE XVII

To an aerosol container fitted with a standard foam head was added 300 grams of the concentrate of Example I. The air was then evacuated from the container. The container was then pressurized with 4.6 grams of carbon dioxide which represented 1.5 weight percent of the composition and 3.1 grams of isobutane which represented 1.0 weight percent of the composition. An effort made to expel the composition from the container. As in the case of the composition of Example XVIII, the high viscosity of the composition prevented the expulsion. These results indicate that compositions of the type described in the present specification and which employ mixtures of carbon dioxide and isobutane, a representative volatile liquid organic compound, as the blowing and propelling atents, can not be used in aerosol containers.

EXAMPLE XVIII

The following composition was prepared and packaged in an aerosol container with a standard foam head as described in the foregoing Example:

| Ingredient | % Weight |
| --- | --- |
| Acrylic emulsion polymer (40% solids) | 55.2 (22) |
| H₂O | 28.4 |
| 1M Zn(NH₃)₄OAc | 7.4 |
| NH₄OH 28% | 3.0 |
| Propylene Glycol | 0.9 (0.9) |
| 10% Ammonium Oleate | 0.7 |
| Microcrystalline cellulose | 0.4 (0.4) |
| Carboxymethyl cellulose | 0.1 (9.1) |
| n-Butane | 3.9 |

The composition was slowly expelled from the container by force of the n-butane propellant and blowing agent to form a white foam. The foam had the consistency of a shave cream. The foam was initially stable, however, it was not self leveling and ultimately collapsed after 24 hours to form a wrinkled film.

EXAMPLE XIX

The following composition was prepared and packaged in an aerosol container with a standard foam held as described in the foregoing Example:

| Ingredient | % Weight |
| --- | --- |
| Acrylic emulsion polymer (50% solids) | 40.47 |
| Water | 43.51 |
| Orange Red pigment | 5.30 |
| ammonium hydroxide (28%) | 3.08 |
| Zinc Acetate | .60 |
| Microcrystalline cellulose | .40 |
| Carboxymethyl cellulose | .10 |
| NH₄ Oleate | .06 |
| *Triton X-405 | .81 |
| n-butane | 5.67 |

*Triton X-405 is a Tradename for an ethoxylated octyl phenol which is manufactured and marketed by Rohm & Hass Corporation.

The composition was slowly expelled from the container by force of the n-butane propellant and blowing agent to form a white foam. The foam had the consistency of a shave cream. The foam was also very stable, however, it was not self leveling and ultimately collapsed after 24 hours to form a wrinkled film.

While certain representative embodiments of the present invention have been shown for the purpose of more particularly illustrating the invention, it will be apparent to those skilled in the art that various changes and modifications may be made therein without departing from the scope and spirit of the invention.

What is claimed is:

1. A composition suitable for preparing a stable cellular foam, said composition comprising:
    an emulsion of one or more foamable polymers of monomers selected from the group consisting of acrylic acid, methacrylic acid and alkyl esters of acrylic and methacrylic acids wherein the alkyl moiety includes from one to eleven carbon atoms, said polymers having a glass transition temperature of less than about 15° C.; a filler and
    dispersed in said emulsion, a foam forming amount of a mixture of nitrous oxide and a volatile organic liquid compound selected from the group consisting of a volatile hydrocarbon, a volatile halogenated hydrocarbon and mixtures thereof; wherein the weight percent ratio of said nitrous oxide to said organic liquid compound is about 1.5:1 to about 6:1 and wherein said foam is self-leveling, water resistant and the volume of said foam is not greater than about six times the volume of said unfoamed composition.

2. A composition according to claim 1 wherein said organic liquid compound is a hydrocarbon having at least two carbon atoms.

3. A composition according to claim 2 wherein said organic liquid compound is a hydrocarbon having from two to seven carbon atoms.

4. A composition according to claim 3 wherein said organic liquid compound is a hydrocarbon selected from the group consisting of propane, n-butane, isobutane, n-pentane, 2-methylbutane, n-hexane, cyclopentane, cyclohexane and mixtures thereof.

5. A composition according to claim 1 wherein said one or more polymers have a mean glass transition temperature of less than 10° C.

6. A composition according to claim 5 wherein said one or more polymers have a mean glass transition temperature of less than −10° C.

7. A composition according to claims 5 or 6 comprising from about 30 to about 60 weight percent of an aqueous polymeric emulsion based on the total weight of the composition wherein said emulsion has a polymer solids content of from about 40 to about 65 weight percent based on the total weight of the emulsion.

8. A composition according to claim 7 comprising from about 40 to about 50 weight percent of an aqueous polymeric emulsion based on the total weight of the composition, wherein said emulsion has a polymer solids content of from about 60 to about 65 weight percent based on the total weight of the emulsion.

9. A composition according to claim 1 wherein the weight percent of said volatile organic liquid compound is from about 0.5 to about 2.5 weight percent based on the total weight of said composition.

10. A composition according to claims 1 or 9 wherein the weight of said nitrous oxide is from about 1 to about 3 weight percent based on the total weight of the composition.

11. A composition suitable for preparing a stable cellular foam, said foam comprising:
from about 30 to about 60 weight percent of an emulsion of a foamable polymer of monomers selected from the group consisting of acrylic acid, methacrylic acid and alkyl esters of acrylic and methacrylic acids wherein the alkyl moiety includes from one to eleven carbon atoms, said polymer having a glass transition temperature of less than 10° C., wherein said emulsion has a polymer solids content of from about 40 to about 65 weight percent based on the total weight of the emulsion; a filler;
from about 0.5 to about 2.5 weight percent of a hydrocarbon having from about 2 to about 7 carbon atoms; and
from about 1 to about 3 weight percent nitrous oxide;
wherein all weight percents are based on the total weight of the composition, unless otherwise indicated.

12. A composition according to claim 54 wherein said foamable polymer is an acrylic polymer.

13. A composition according to claim 11 wherein said emulsion is water based.

14. A composition according to claim 11 wherein said hydrocarbon is selected from the group consisting of isobutane, n-butane, n-pentane and n-hexane.

15. A method of caulking or insulating which comprises applying an effective amount of a composition according to claims 1, 2, 3, 4, 5, 6, 7, or 12, 13, or 14 to the site to be caulked or insulated.

16. In an improved aerosol container of the type comprising a pressurized container of a foamable composition, said container also containing a foaming agent for foaming said composition and a propelling agent for propelling said composition from said container to form a cellular foam, and said container having dispensing means suitable for the production of foam, the improvement which is a composition comprising:
an emulsion of one or more foamable polymers of monomers selected from the group consisting of acrylic acid, methacrylic acid and alkyl esters of acrylic and methacrylic acids wherein the alkyl moiety includes from one to eleven carbon atoms, said polymers having glass transition temperatures below about 15° C.; a filler and
dispersed in said emulsion, a foam forming and propelling amount of a mixture nitrous oxide and a volatile organic liquid compound selected from the group consisting of a volatile hydrocarbon, a volatile halogenated hydrocarbon and mixtures thereof, wherein the ratio of nitrous oxide to said volatile organic liquid is from about 1.5:1 to 6:1; and
wherein the weight ratio of said volatile organic liquid compound to nitrous oxide is selected such that said foam is self-leveling, water resistant and the volume of said foam is not greater than six times the volume of said unfoamed composition.

17. In an aerosol container according to claim 16 wherein said organic liquid compound is a hydrocarbon having at least two carbon atoms.

18. In an aerosol container according to claim 17 wherein said organic liquid compound is a hydrocarbon having from two to seven carbon atoms.

19. In an aerosol container according to claim 18 wherein said organic liquid compound is a hydrocarbon selected from the group consisting of propane, n-butane, isobutane, n-pentane, 2-methylbutane, n-hexane, cyclopentane, cyclohexane and mixtures thereof.

20. In an aerosol container according to claim 19 wherein one or more of said polymers have a mean glass transition temperature of less than −10° C.

21. In an aerosol container according to claim 19 wherein said polymers are homopolymers of monomers selected from the group consisting of acrylic acid, methacrylic acid and alkyl esters of acrylic and methacrylic acids, wherein the alkyl moieties include from one to seven carbon atoms.

22. In an aerosol container according to claims 19 or 20 comprising from about 30 to about 60 weight percent of an aqueous polymeric emulsion based on the total weight of the composition, wherein said emulsion has a polymer solids content of said emulsion of from about 40 to about 65 weight percent based on the total weight of the emulsion.

23. In an aerosol container according to claim 22 comprising from about 40 to about 50 weight percent of an aqueous polymeric emulsion based on the total weight of the composition, wherein said emulsion has a polymer solids content of from about 60 to about 65 weight percent based on the total weight of the emulsion.

24. In an aerosol container according to claim 16 wherein the weight percent of a said volatile organic liquid compound is from about 0.5 to about 2.5 weight percent based on the total weight of said composition.

25. In an aerosol container according to claim 16 wherein the weight of said nitrous oxide is from about 1 to about 3 weight percent based on the total weight of the composition.

26. In an improved aerosol container of the type comprising a pressurized container of a foamable composition, said container also contains a foaming agent for foaming said composition from said container to form a cellular foam, said container having dispensing means suitable for the production of foam, the improvement which is a composition comprising:
from about 30 to about 60 weight percent of an emulsion of a foamable polymer selected from the group consisting of acrylic acid, methacrylic acid and alkyl esters of acrylic and methacrylic acids wherein the alkyl moiety includes from one to eleven carbon atoms, said polymer having a glass transition temperature of less than 15° C., wherein said emulsion has a polymer solids content of from about 40 to about 65 weight percent, based on the total weight of the emulsion; a filler;

from about 0.5 to about 2.5 weight percent of a hydrocarbon having from about 2 to about 7 carbon atoms; and from about 1 to about 3 weight percent nitrous oxide; wherein all weight percents are based on the total weight of the composition, unless otherwise indicated.

27. In an aerosol container according to claim 26 wherein said foamable polymer is an acrylic polymer.

28. In an aerosol container according to claim 26 wherein said emulsion is water based.

29. In an aerosol container according to claim 26 wherein said hydrocarbon is selected from the group consisting of isobutane, n-butane, n-pentane and n-hexane.

30. A composition suitable for preparing a stable cellular foam, said foam comprising:

from about 30 to about 60 weight percent of an emulsion of an acrylic polymer selected from the group consisting of acrylic acid, methacrylic acid and alkyl esters of acrylic and methacrylic acids wherein the alkyl moiety includes from one to eleven carbon atoms, said polymer having a glass transition temperature of less than 15° C., wherein said emulsion has a polymer solids content of from about 40 to about 65 weight percent based on the total weight of the emulsion; a filler;

from about 0.25 to about 1.5 weight percent of a hydrocarbon having from about 2 to about 7 carbon atoms; and from about 1 to about 2.5 weight percent nitrous oxide;

wherein all weight percents are based on the total weight of the composition, unless otherwise indicated.

31. A method of caulking or insulating which comprises applying an effective amount of a composition according to claim 30 to the site to be caulked or insulated.

32. In an improved aerosol container of the type comprising a pressurized container of a foamable composition, said container also containing a foaming agent for foaming said composition and a propelling agent for propelling said composition from said container to form a cellular foam, and said container having dispensing means suitable for the production of foam, the improvement comprising a composition according to claim 30.

* * * * *

UNITED STATES PATENT AND TRADEMARK OFFICE
CERTIFICATE OF CORRECTION

PATENT NO. : 4,350,774
DATED : September 21, 1982
INVENTOR(S) : Frank Scotti and Edward H. Page It is certified that error appears in the above—identified patent and that said Letters Patent is hereby corrected as shown below:

In Col. 1, line 23, delete "masonary" and insert -- masonry --.

In Col. 9, line 15, delete "ov" and insert -- of --.

In Col. 15, line 47, delete "54" and insert -- 11 --.

In Col. 15, line 56, delete "7, or" and insert -- 9, 11 or --.

Signed and Sealed this

Twenty-sixth Day of July 1983.

[SEAL]

Attest:

GERALD J. MOSSINGHOFF

Attesting Officer

Commissioner of Patents and Trademarks